United States Patent
McKenney (10) Patent No.: US 7,734,833 B2
(45) Date of Patent: Jun. 8, 2010

(54) METHOD FOR SCHEDULING OPERATIONS CALLED BY A TASK ON A REAL-TIME OR NON-REAL TIME PROCESSOR

(75) Inventor: Paul Edward McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 11/222,525

(22) Filed: Sep. 8, 2005

(65) Prior Publication Data

US 2007/0083871 A1    Apr. 12, 2007

(51) Int. Cl.
G06F 3/00 (2006.01)
G06F 9/44 (2006.01)
G06F 9/46 (2006.01)

(52) U.S. Cl. ............... 710/5; 710/6; 710/15; 712/220; 712/225; 718/102; 718/105

(58) Field of Classification Search ............ 710/5
See application file for complete search history.

(56) References Cited

U.S. PATENT DOCUMENTS

| | | | |
|---|---|---|---|
| 5,349,656 A * | 9/1994 | Kaneko et al. ............ 718/102 |
| 5,872,972 A * | 2/1999 | Boland et al. ............ 718/102 |
| 5,961,585 A | 10/1999 | Hamlin |
| 5,995,745 A | 11/1999 | Yodaiken |
| 6,085,218 A | 7/2000 | Carmon |
| 6,110,220 A | 8/2000 | Dave et al. |
| 6,148,389 A | 11/2000 | So |
| 6,167,425 A | 12/2000 | Beckhoff |
| 6,269,391 B1 * | 7/2001 | Gillespie ............ 718/100 |
| 6,560,717 B1 * | 5/2003 | Scott et al. ............ 714/4 |
| 6,662,203 B1 * | 12/2003 | Kling et al. ............ 718/103 |
| 6,665,872 B1 * | 12/2003 | Krishnamurthy et al. ...... 725/95 |
| 6,708,194 B1 | 3/2004 | Korn |
| 7,165,252 B1 * | 1/2007 | Xu ............ 718/102 |
| 7,308,686 B1 * | 12/2007 | Fotland et al. ............ 718/102 |
| 7,353,517 B2 * | 4/2008 | Accapadi et al. ............ 718/102 |
| 7,446,773 B1 * | 11/2008 | Alben et al. ............ 345/502 |
| 7,502,910 B2 * | 3/2009 | Damron ............ 712/34 |
| 2001/0054055 A1 | 12/2001 | Bollella |
| 2002/0038416 A1 | 3/2002 | Fotland et al. |
| 2002/0073129 A1 * | 6/2002 | Wang et al. ............ 709/102 |
| 2002/0078121 A1 | 6/2002 | Ballantyne |
| 2003/0088606 A1 | 5/2003 | Miller et al. |

(Continued)

OTHER PUBLICATIONS

U.S. Patent Application entitled "Hard Real-Time Response", U.S. Appl. No. 11/017,083, filed Dec. 20, 2004, by inventors P.E. McKenny and D. Sarma.

(Continued)

Primary Examiner—Henry W. H. Tsai
Assistant Examiner—Michael Sun
(74) Attorney, Agent, or Firm—Lieberman & Brandsdorfer, LLC (57) ABSTRACT

Provided is a method for scheduling operations called by a task on a real-time or non-real-time processor. Execution durations are provided for operations. A call is received from a task for an operation. A determination is made of a latency requirement for a first processor and of the execution duration of the called operation. The called operation is executed on the first processor in response to determining that the determined execution duration is less than the latency requirement. The called operation is executed on a second processor in response to determining that the determined execution duration is greater than the latency requirement.

20 Claims, 5 Drawing Sheets

U.S. PATENT DOCUMENTS

| | | | |
|---|---|---|---|
| 2004/0015971 | A1 | 1/2004 | Spoltore et al. |
| 2004/0030872 | A1 | 2/2004 | Schlansker |
| 2004/0088704 | A1 | 5/2004 | Owen et al. |
| 2004/0187120 | A1* | 9/2004 | Moore et al. ................ 718/100 |
| 2005/0015768 | A1 | 1/2005 | Moore |
| 2005/0177344 | A1* | 8/2005 | Khaleel ...................... 702/186 |
| 2005/0251806 | A1 | 11/2005 | Auslander et al. |

OTHER PUBLICATIONS

V. Yodaiken, "FSMLabs RTLinux Hard Realtime OS and POSIX 1003.13", FSMLabs Inc., pp. 1-33.

P. Gerum, "RTAI Fusion", [online] Nov. 3, 2003, pp. 1.7, [Retrieved Jun. 2, 2005] Retrieved at URL<http://www.fdn.fr/~brouchou/rtai/rtai-doc-prj/rtai-fusion-p.html>.

P. Marquet et al., "An Asymmetric Model for Real-Time and Load Balancing on Linux SMP* ", LIFL Report # 2004-04, Laboratoire d'informatique fondamentale de Lille Universite des sciences et technologies de Lille France, Apr. 2004, pp. 1-10.

P.E. McKenney,"[RFC][Patch] Restricted Hard Realtime", Oct. 23, 2004, pp. 1-5, [online][retrieved Sep. 8, 2005] http://marc.theaimsgroup.com/?1=linux-kernel&m=109856136810690&w=2.

* cited by examiner

METHOD FOR SCHEDULING OPERATIONS CALLED BY A TASK ON A REAL-TIME OR NON-REAL TIME PROCESSOR

BACKGROUND OF THE INVENTION

1. Field of the Invention

The present invention relates to a method, system, and program for scheduling operations called by a task on a real-time or non-real-time processor.

2. Description of the Related Art

General operating systems may be classified into three general categories associated with completion of a task or operations (processing steps) called by a task within a predefined time interval. The three general categories are known as hard real-time operating systems, soft real-time operating systems, and non-real-time operating systems. A hard real-time operating system guarantees that deadlines will be met. Processing steps in a hard real-time operating system are known as deterministic operations. The terms hard real-time processing steps and deterministic operations are used interchangeably. In hard real-time systems, if a deterministic operation completes correctly but takes longer than its given amount of time, the operation fails. A soft real-time system is less restrictive than a hard real-time system. In a soft real-time system, critical operations are given priority over non-critical operations (e.g., processes). However, the scheduling-deadline requirements in a soft real-time system are less severe than those in a hard real-time system. For example, in a soft real-time system if an operation called by a soft real-time task completes correctly but takes longer than the amount of time allotted for such operation, then the result may still be useful. However, in a hard real-time system, if an operation completes correctly but takes longer than the amount of time allotted for such operation, then the result will not be useful. In a non-hard real-time system, the operations are non-deterministic operations and as such are not subject to real-time latency constraints.

A non-hard real time task comprises a task that executes non-deterministic operations, which are not required to complete within a given deadline to be successful. A hard real time task comprises a task that executes deterministic operations that are required to occur before a given deadline. In soft real-time, hard real-time, and non-hard real-time systems, a scheduler is utilized to determine the amount of resources (e.g., CPU time) that a process is allotted for execution. The scheduler is part of the kernel in an operating system that initiates and terminates operating system processes and threads. In addition, the scheduler may periodically decide which thread should be run next and switch control to that thread.

In the copending and commonly assigned patent application entitled "Hard Real-Time Response", by Paul E. McKenney and Dipankar Sarma, having U.S. application Ser. No. 11/017,083, filed on Dec. 20, 2004, processing units are designated as hard real-time or non-hard real time. Operations (processing steps) to be deterministic are processed by the hard real-time processor and operations steps determined to be non-deterministic are processed by the non-hard real-time processor.

SUMMARY

Provided are a method, system, and program for scheduling operations called by a task on a real-time or non-real-time processor. Execution durations are provided for operations. A call is received from a task for an operation. A determination is made of a latency requirement for a first processor and of the execution duration of the called operation. The called operation is executed on the first processor in response to determining that the determined execution duration is less than the latency requirement. The called operation is executed on a second processor in response to determining that the determined execution duration is greater than the latency requirement.

In a further embodiment, execution durations are provided for operations. A call is received from a task for an operation. A determination is made of a latency requirement for a first processor and of the execution duration of the called operation. A determination is further made as to whether the called operation is deterministic or non-deterministic. The called operation is executed on the first processor in response to determining that the operation is deterministic and that the determined execution duration is less than the latency requirement. The operation is executed on the second processor in response to determining that the operation is non-deterministic or that the operation is deterministic and that the execution duration is greater than the latency requirement.

In a further embodiment, a system includes a first processor, a second processor, a third processor, and a memory. An operating system is executed in the memory to perform operations, the operations comprising: providing execution durations for operations; receiving a call from a task for an operation; determining a first latency requirement for the first processor, wherein a second latency requirement is associated with the third processor and is greater than the first latency requirement; determining the execution duration of the called operation; executing the called operation on the first processor in response to determining that the determined execution duration is less than the latency requirement; executing the called operation on the second processor in response to determining that the determined execution duration is greater than the latency requirement; determining whether the determined execution duration is less than the second latency requirement in response to determining that the determined execution duration is greater than the first latency requirement; and executing the called operation on the third processor in response to determining that the determined execution duration is less than the second latency requirement, wherein the called operation is executed on the second processor in response to determining that the determined execution duration is greater than both the first and second latency requirements.

DETAILED DESCRIPTION

Figure 1:
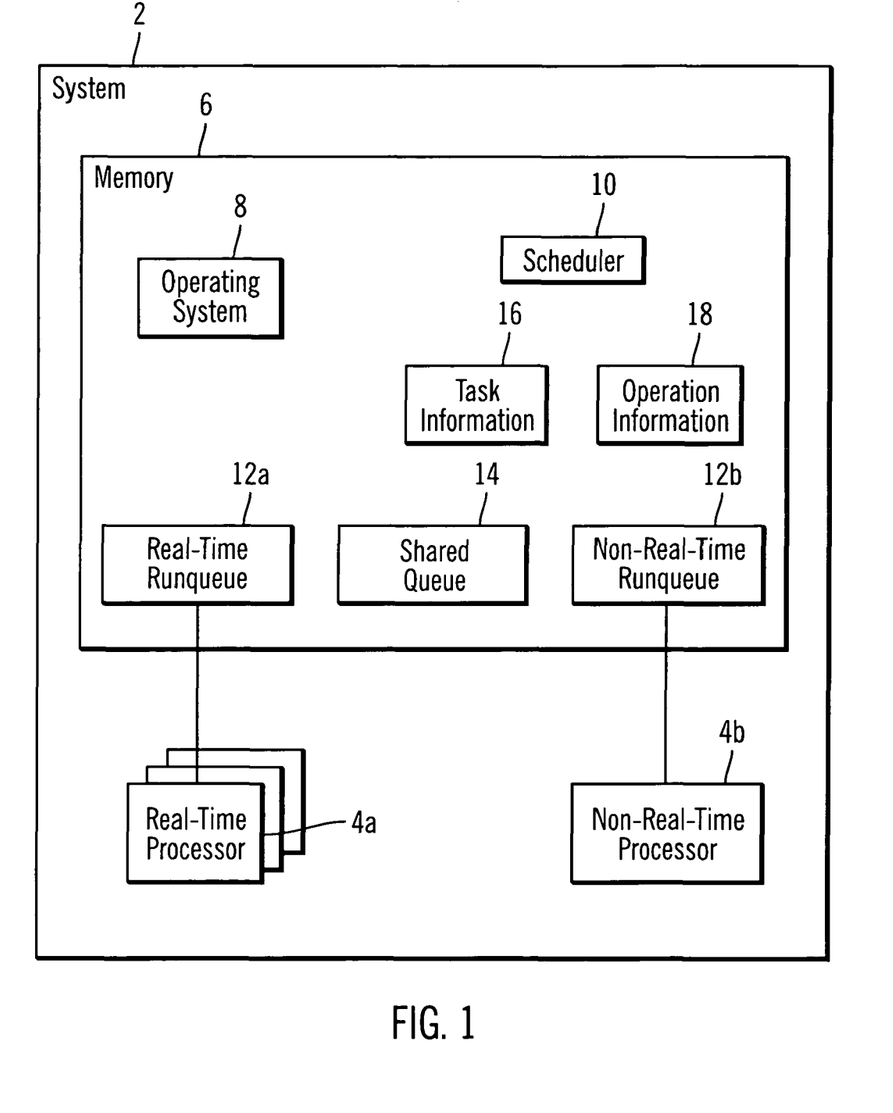
FIG. 1 illustrates an embodiment of a computing environment.

FIG. 1 illustrates a computing system 2 including processors 4a and 4b and memory 6 including programs executed by the processors 4a, 4b. FIG. 1 shows real-time processor 4a representing one or more processors. The memory 6, which may comprise one or more physical memory devices, includes an operating system 8, a scheduler 10 to schedule tasks to execute on a real-time 4a or non-real time processor 4b, and a real-time 12a and non-real-time 12b runqueues used to queue tasks for the real-time 4a and non-real-time 4b processors, respectively. A shared queue 14 is used for transferring tasks between the real-time 4a and non-real-time 4b processors. The scheduler 14 uses task information 16 on tasks executed in the operating system 8 and operation information 18 on operations (also known as processing steps) invoked by tasks executing in the operating system 8 on one of the processors 4a, 4b. The scheduler 14 may be executed by one or multiple processors 4a, 4b. In one embodiment, the scheduler may execute on the real-time processor 4a.

The processors 4a, 4b may comprise separate physical central processing units (CPUs) in a multi-processor system. Alternatively, the processors 4a, 4b may comprise separate hardware threads executing concurrently in a one or more physical CPU devices or virtual processors implemented in a virtual layer within one or more physical CPU devices. A task comprises an application or code executed as a sequence of operations in a thread or process implemented in the processor 4a, 4b. An operation is code called by a task executing on a thread, such as a system call, interrupt, exception or other operation. The operation may be called directly by the task or invoked as a result of execution of the task, such as an exception or interrupt. The scheduler 10 may schedule tasks executed by a processor 4a, 4b, where the tasks are queued in the processor runqueues 12a, 12b. The scheduler 10 may be part of a kernel of the operating system 8 and initiates and terminates threads and processes that execute the tasks. The scheduler 10 may initially assign a task upon task initialization to the processor 4a, 4b associated with the priority 34 of the task, where the task priority 34 may be used to distinguish between real-time tasks executed by a real-time processor 4a and a non-real-time task executed by a non-real-time processor 4b. In this way, tasks identified as real-time priority 34 are assigned to the real-time processor 4a and tasks identified as a non-real-time priority 34 are assigned to the non-real-time processor 4b. There may be multiple levels of real-time priority indicated in the priority 34 if there are multiple real-time processors.

Figure 2:
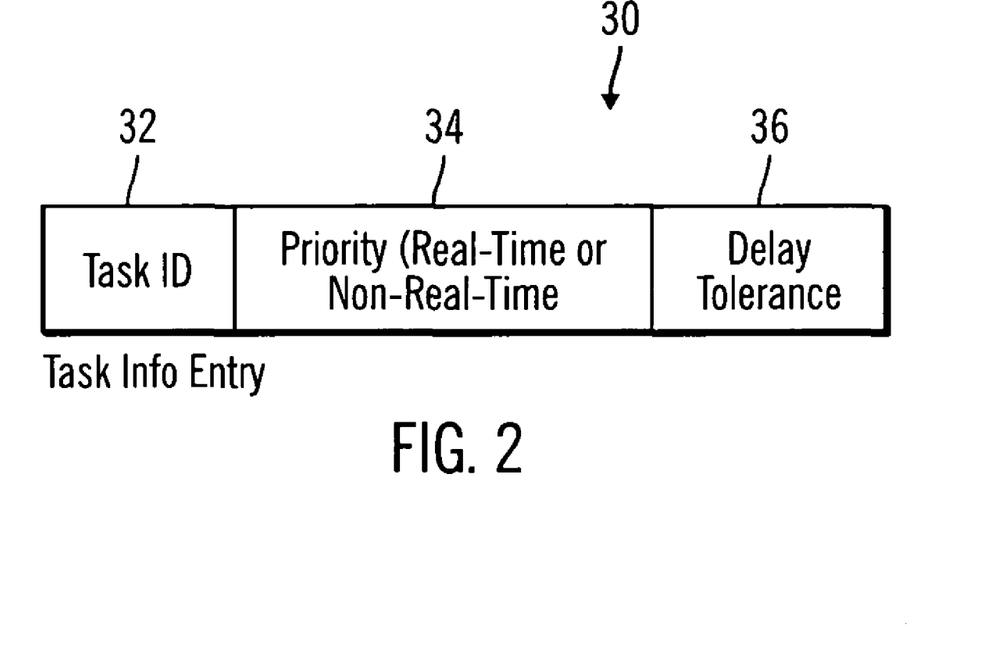
FIG. 2 illustrates an embodiment of task information.

FIG. 2 illustrates an embodiment of a task information entry 30 maintained in the task information 16 for a task capable of executing in the operating system 8. The task information entry 30 includes a task identifier 32, a priority indicator 34 (e.g., real-time or non-real-time) of the task, and a delay tolerance 36 for real-time priority tasks indicating a maximum amount of delay that is allowed before execution of the task must begin. In one embodiment, the priority indicator 34 associates the task with one or more processors handling tasks of the given priority (e.g., real-time or non-real-time). For instance, a real-time priority (e.g., hard real time) designation may indicate that the task is executed by the real-time (e.g., hard real-time) processor 4a, whereas a non-real-time (e.g., non-hard real time) designation may indicate that the task is executed by the non-real-time priority (non-hard real time) processor 4b.

A real-time task may be indicated by a real-time indicator or designation, such as a hard real time task, a soft real time task, etc. As discussed, a hard real time task executed in a hard real time system guarantees that operations will complete in a defined amount of time, such that the operations invoked for a hard real time task are deterministic, such that if the operations do not complete within the required time, the task fails. A soft real time task executed in a soft real time system is less restrictive than a hard real time task, such that if the operation takes longer than its given time, the result may still be useful. In a non-hard real time system, the task steps are non-deterministic and are not subject to real time processing restraints.

Figure 3:
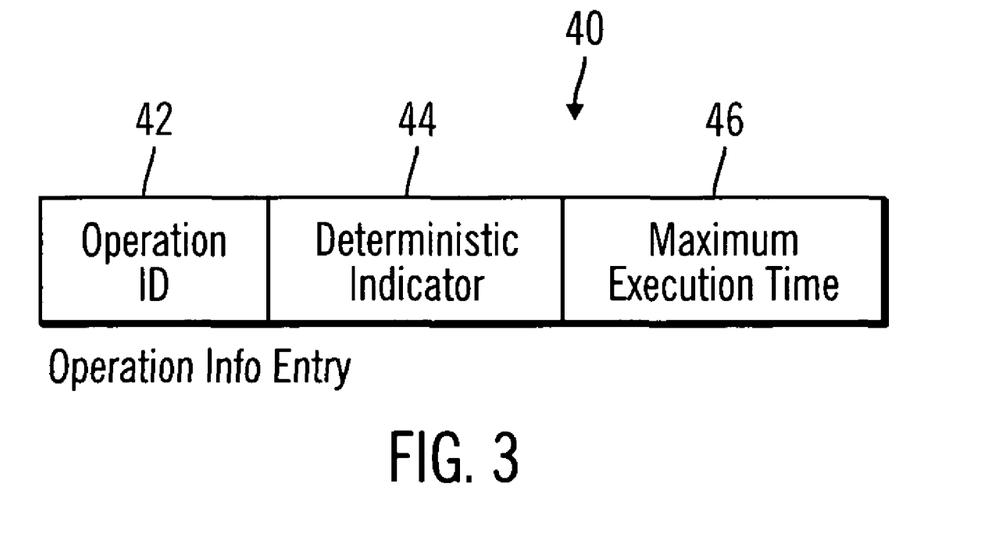
FIG. 3 illustrates an embodiment of operation information.

FIG. 3 illustrates an embodiment of an operation information entry 40 providing information on one operation capable of being called by an executing task, and including an operation identifier 42, a deterministic indicator 44 indicating whether the operation is deterministic or non-deterministic, and a maximum execution time 46, which may indicate an estimated time or worst case time for the operation to complete. A deterministic operation is one that must complete within a specified amount of time, which may comprise the maximum execution time 46, whereas a non-deterministic operation is one that does not have the deterministic execution time constraint.

Figure 4:
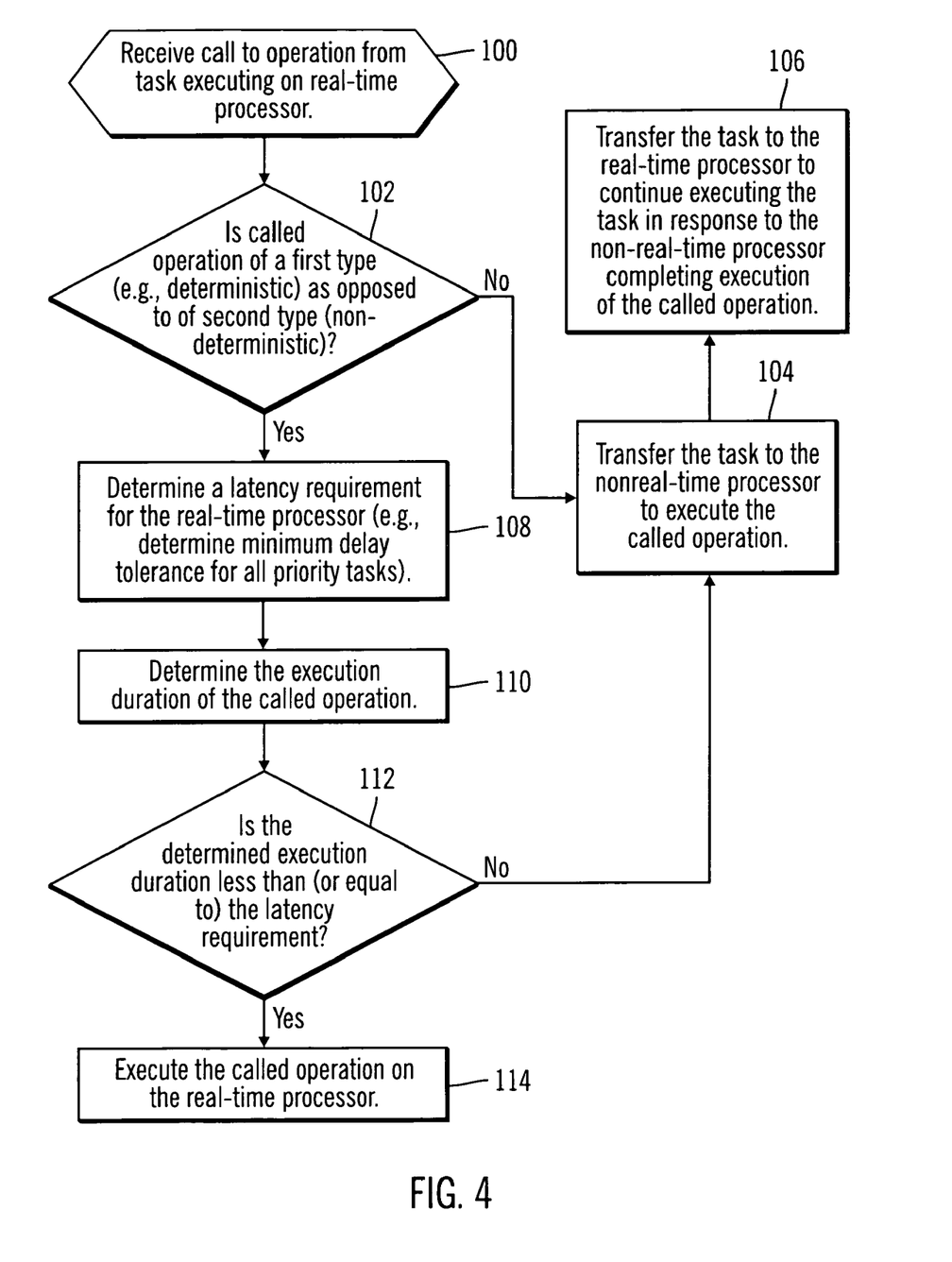
FIGS. 4 and 6 illustrate embodiments of operations to determine a processor to process an operation called by a task.

FIG. 4 illustrates an embodiment of operations performed by the scheduler 10 to determine the processor 4a or 4b to execute an operation called by a task executing on the real-time processor 4a. In response to receiving (at block 100) a call to an operation from a task executing on the real-time processor 4a, a determination is made (at block 102) as to whether the called operation is of a first type (e.g., deterministic) as opposed to of a second type (e.g., non-deterministic). In one embodiment, the determination may be made as to whether the called operation is deterministic or non-deterministic as indicated in the deterministic indicator 44. In an alternative embodiment, the determined type of the operation may comprise a categorization of the operation different from being deterministic or non-deterministic. If (at block 102) the operation is of the second type, e.g., non-deterministic, then the scheduler 10 transfers (at block 104) the task to the non-real-time processor 4b to execute the called operation. After the operation is executed at the non-real-time processor 4b, the task is transferred back (at block 106) to the real-time processor 4b to continue executing the task.

If (at block 102) the called operation is of the first type, e.g., deterministic, then the scheduler 10 determines (at block 108) the latency requirement for the real-time processor 4a. In one embodiment, the latency requirement for the real-time processor 4a may be a value specified by the user via a system call or other program call to set a global variable for the latency requirement, which is the maximum delay within which all tasks assigned to the real-time processor 4a are guaranteed to begin execution. In an additional embodiment, the latency requirement may be the minimum delay tolerance 36 for all real-time priority tasks, e.g., hard real-time tasks. This ensures that all tasks designated with the real-time priority would begin execution on the real-time processor 4a within their delay tolerance, thus ensuring the performance requirements of the real-time priority task.

The scheduler 10 further determines (at block 110) the execution duration of the called operation and whether (at block 112) the determined execution duration for the called operation is less than (or equal to) the latency requirement. If (at block 112) the duration of the called operation exceeds the latency requirement, then control proceeds to block 104 to transfer the task to the non-real-time processor 4b to execute and then to block 106. Otherwise, if the duration is less than the latency requirement, then the called operation is executed (at block 114) on the real-time processor 4a.

With the embodiment of FIG. 4, the real-time processor 4a avoids executing an operation that could prevent the real-time processor 4a from delaying execution of one real-time task beyond the delay tolerance for that task. If an operation would possibly cause the real-time processor to not meet the delay tolerance of a real-time task, then that operation will be migrated to the non-real-time processor 4b to execute.

Figure 5:
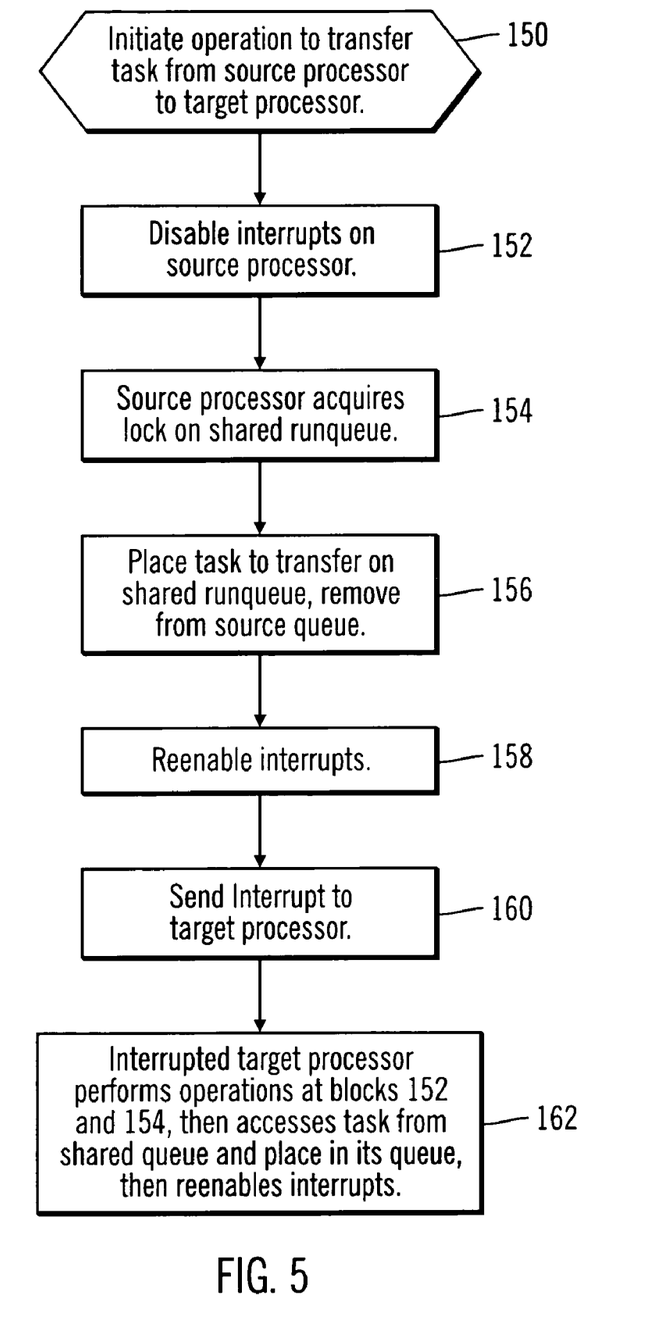
FIG. 5 illustrates an embodiment of operations to transfer a task from one processor to another.

FIG. 5 illustrates operations to transfer a task from the runqueue 12a, 12b of one source processor 4a, 4b to a target processor 4a, 4b, such as performed at blocks 104 and 106 in FIG. 4. These operations may be performed by the processor 4a, 4b and/or the scheduler 10. Upon initiating (at block 150) an operation to transfer a task from a source processor 4a, 4b to a target processor 4a, 4b, the interrupts on the source processor are disabled (at block 152) and the source processor acquires (at block 154) a lock on the shared queue 14. The source processor 4a, 4b places (at block 156) the task to transfer on the shared queue 14 and removes the task from the source runqueue 12a, 12b. The source processor 4a, 4b then reenables (at block 158) interrupts and sends (at block 160) an interrupt to the target processor to pull the task from the shared queue 14 to the target processor runqueue 12a, 12b. The interrupted target processor performs (at block 162) the operations at blocks 152 and 154 to disable interrupts and acquire the lock on the shared queue 14, and then accesses the task from the shared queue 14 and places in the target runqueue 12a, 12b, then reenables interrupts.

Figure 6:
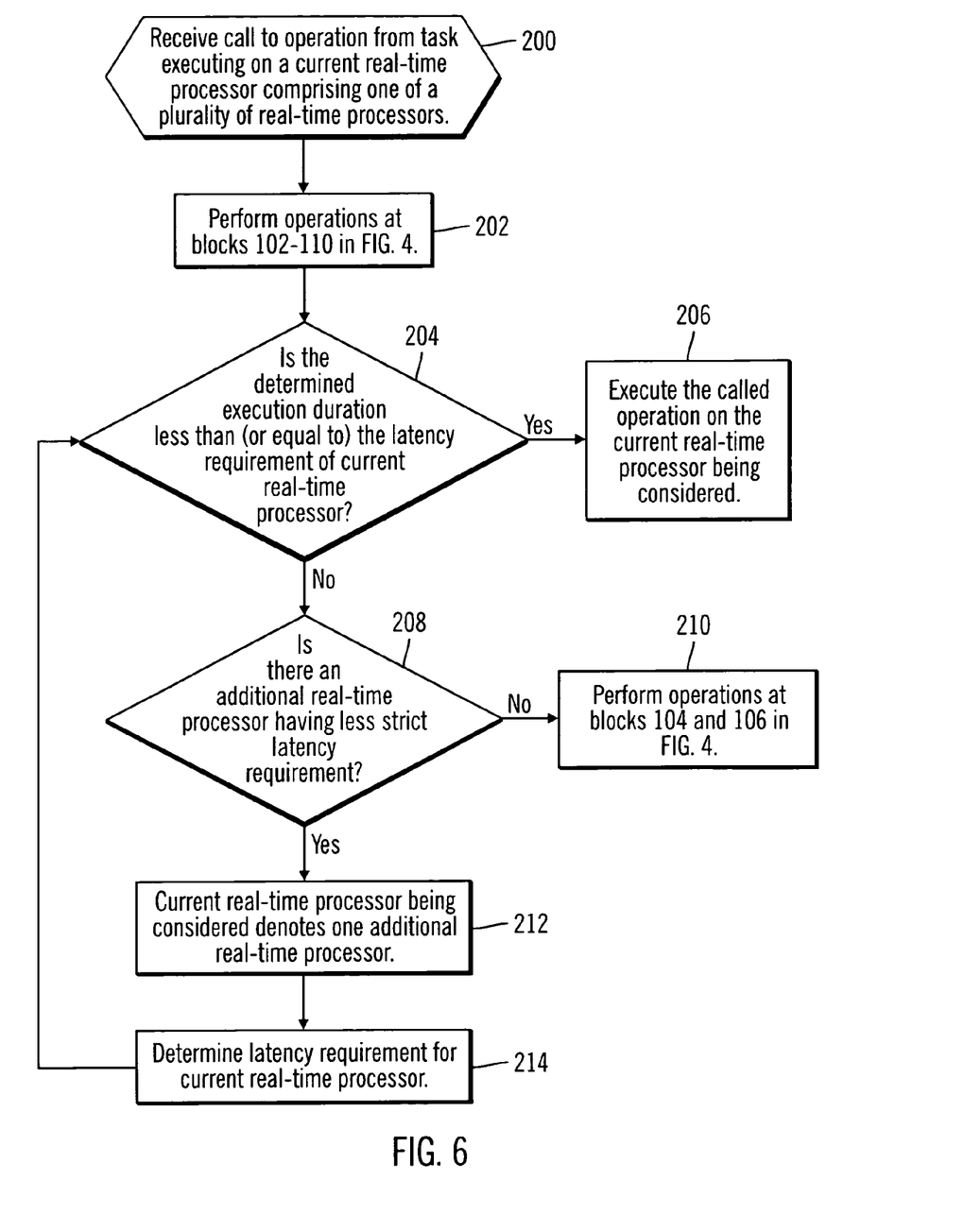

In an additional embodiment, there may be multiple real-time processors, each having its own latency requirement, where a highest real-time processor has the strictest latency requirement, i.e., minimum delay tolerance. FIG. 6 illustrates an embodiment of operations implemented by the scheduler 10 to process an operation invoked for a task when there are multiple real-time processors 4a (such as shown in FIG. 1), each having their own latency (delay tolerance) requirement. The task information 30 may indicate the real-time processor to which the task is assigned. Upon the scheduler 10 receiving (at block 200) a call to an operation from a task executing on a current real-time processor, which comprises the real-time processor to which the task is assigned, the scheduler 10 performs (at block 202) the operations at blocks 102-110 in FIG. 4. If (at block 204) the determined execution duration of the called operation is less than (or equal to) the latency requirement of the current real-time processor, then the scheduler 10 executes (at block 206) the called operation on the current real-time processor being considered. The current real-time processor may comprise the real-time processor to which the task is assigned in the task information 30 or another real-time processor being considered. If the current real-time processor is not the real-time processor on which the task is currently executing, then the transfer operations of FIG. 5 are performed to transfer the task to the current real-time processor 4a being considered to execute the called operation and return the task to the real-time processor 4a to which the task is assigned after completing the called operation.

If (at block 204) the determined execution duration of the called operation is greater than the latency requirement of the current real-time processor being considered and if (at block 208) there are no additional real-time processors having a less strict latency requirement, e.g., greater delay tolerance, then control proceeds (at block 210) to perform the operations at blocks 104 and 106 in FIG. 4 to transfer the task to the non-real-time processor. Otherwise, if (at block 208) there is an additional real-time processor 4a having less of a latency requirement, e.g., greater delay tolerance, then the current real-time processor being considered denotes the determined (at block 212) additional real-time processor. The scheduler 10 then determines (at block 214) the latency requirement for the current real-time processor and control proceeds to block 204 to determine whether to use the current real-time processor to process the called operation.

With the described operations of FIG. 6, an attempt is made to process an operation on one of a plurality of real-time processors having the greatest latency requirement, i.e., minimum delay tolerance, If the execution time of the called operation exceeds the latency requirements of all the real-time processors, then the operations is executed by the non-real-time processor 4b.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). The transmission signals in which the code is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium and/or hardware logic in which code may be implemented. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article or a different number of devices/articles may be used in place of the described more than one device or article.

The functionality and/or the features of a device may be alternatively embodied by one or more other devices which are not explicitly described as having such functionality/features. Thus, other embodiments of the present invention need not include the device itself.

The illustrated operations of FIGS. 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving a call from a real-time task for an operation, wherein said real time task is required to complete within a given time interval;
   prior to starting an execution of the operation, determining a latency requirement for a real time processor, said latency requirement defined as a maximum delay within which all tasks assigned to the real time processor are guaranteed to begin execution;
   prior to starting the execution of the operation, determining a maximum execution duration of the called operation;
   executing the called operation on the real time processor in response to determining that the determined execution duration is less than the latency requirement; and
   executing the called operation on a non real time processor in response to determining that the determined execution duration is greater than the latency requirement.

2. The method of claim 1, further comprising:
   transferring execution of a task from one processor comprising one of the real time and non-real time processors to another processor comprising one of the real time and non-real time processors by placing the task in a shared queue to be transferred from one processor to another.

3. The method of claim 1, wherein determining the latency requirement comprises:
   providing a delay tolerance for each real time task indicating a time within which execution of the task must begin in response to being called; and
   determining a minimum delay tolerance for a set of tasks.

4. The method of claim 3, wherein tasks may be of a real time type or a non-real-time type, wherein tasks of the real time type are assigned to the real time processor for execution and wherein tasks of the non-real time type are assigned to the non-real-time processor for execution, wherein the set of tasks for which delay tolerances are provided comprises the real-time type of tasks.

5. The method of claim 4, wherein tasks of the real time type have a higher execution priority over tasks of the non-real time type.

6. The method of claim 4, wherein the real time type of task is deterministic and wherein the non-real time type of tasks is non-deterministic.

7. The method of claim 1, wherein the latency requirement is a maximum delay time during which execution of tasks assigned to the real time processor must begin.

8. The method of claim 1, wherein each real time task is executed on a thread in the operating system, wherein each real time task invokes multiple operations, and wherein the operations invoked by the tasks are members of a set of operations comprising system calls, interrupts and exceptions.

9. The method of claim 1, wherein the latency requirement comprises a first latency requirement associated with the first real time processor and wherein a second latency requirement is associated with a third processor and is greater than the first latency requirement, wherein the task is executing on the first real time processor when the call for operation is received, and wherein the operations further comprise:
   determining whether the determined execution duration is less than the second latency requirement in response to determining that the determined execution duration is greater than the first latency requirement; and
   executing the called operation on the third real time processor in response to determining that the determined execution duration is greater than the second latency requirement, wherein the called operation is executed on the second real time processor in response to determining that the determined execution duration is greater than both the first and second latency requirements.

10. The method of claim 1, wherein the task is executing on is executing on real time processor, and wherein the operations further comprise:
    transferring the task to the non-real time processor to execute the called operations in response to determining that the operation is to be executed on the non-real time processor; and
    transferring the task to the real time processor to continue executing the task in response to the non-real time processor completing execution of the called operation.

11. An article of manufacture including code executed to perform operations to schedule tasks between a first processor and a second processor, the operations comprising:
    receiving a call from a real-time task for an operation, wherein said real time task is required to complete within a given time interval;
    prior to starting an execution of the operation, determining a latency requirement for a real time processor, said latency requirement defined as a maximum delay within which all tasks assigned to the real time processor are guaranteed to begin execution;
    prior to starting the execution of the operation, determining a maximum execution duration of the called operation;
    executing the called operation on the real time processor in response to determining that the determined execution duration is less than the latency requirement; and
    executing the called operation on a non real time processor in response to determining that the determined execution duration is greater than the latency requirement.

12. The article of claim 11, wherein determining the latency requirement comprises:
    providing a delay tolerance for each real time task indicating a time within which execution of the task must begin in response to being called; and
    determining a minimum delay tolerance for a set of tasks.

13. The article of claim 12, wherein tasks may be of a real time type or a non-real-time type, wherein tasks of the real time type are assigned to the real time processor for execution and wherein tasks of the non-real time type are assigned to the non-real-time processor for execution, wherein the set of tasks for which delay tolerances are provided comprises the real-time type of tasks.

14. The article of claim 13, wherein tasks of the real time type have a higher execution priority over tasks of the non-real time type.

15. The article of claim 13, wherein the real time type of task is deterministic and wherein the non-real time type of tasks is non-deterministic.

16. A system comprising:
    a first processor;
    a second processor;
    a memory; and
    an operating system executed in the memory to perform operations, the operations comprising:
        receiving a call from a real-time task for an operation, wherein said real time task is required to complete within a given time interval;
        prior to execution of the operation, determining a latency requirement for a real time processor, said latency requirement defined as a maximum delay within which all tasks assigned to the real time processor are guaranteed to begin execution;
        prior to execution of the operation, determining a maximum execution duration of the called operation;
        executing the called operation on the real time processor in response to determining that the determined execution duration is less than the latency requirement; and
        executing the called operation on a non real time processor in response to determining that the determined execution duration is greater than the latency requirement.

17. The system of claim 16, wherein the operation for determining the latency requirement further comprise:
    providing a delay tolerance for each real time task indicating a time within which execution of the task must begin in response to being called; and
    determining a minimum delay tolerance for a set of tasks.

18. The system of claim 17, wherein tasks may be of a real time type or a non-real-time type, wherein tasks of the real time type are assigned to the real time processor for execution and wherein tasks of the non-real time type are assigned to the non-real-time processor for execution, wherein the set of tasks for which delay tolerances are provided comprises the real-time type of tasks.

19. The system of claim 18, wherein tasks of the real time type have a higher execution priority over tasks of the non-real time type.

20. The system of claim 18, wherein the real time type of task is deterministic and wherein the non-real time type of tasks is non-deterministic.

* * * * *